March 26, 1940. E. W. BIDDINGER 2,195,356
FISHING DEVICE
Filed Nov. 21, 1938
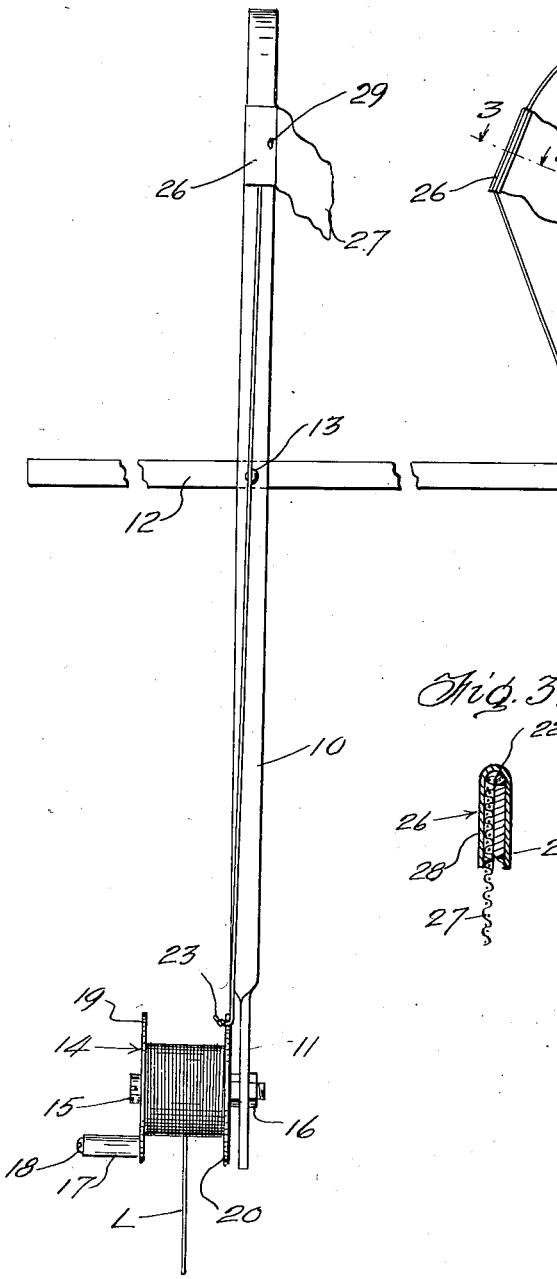
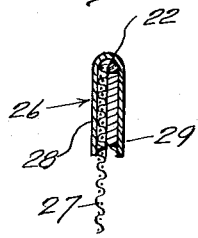
Inventor
EDWARD W. BIDDINGER,
By Kimmel & Crowell,
Attorneys Patented Mar. 26, 1940

2,195,356

UNITED STATES PATENT OFFICE 2,195,356

FISHING DEVICE

Edward W. Biddinger, Pontiac, Mich.

Application November 21, 1938, Serial No. 241,685

1 Claim. (Cl. 43—17)

This invention relates to fishing devices and more particularly to a device adapted for use in fishing through a hole cut in the ice.

An object of this invention is to provide a fishing device of this kind which is so constructed that it can be readily collapsed into a small space so as to facilitate the carrying or packing thereof.

Another object of this invention is to provide a device of this kind which will prevent the trigger line from freezing in the ice.

A further object of this invention is to provide a device of this kind which includes a reel adapted to be submerged below the ice and the reel is held against rotation by a trigger means extending above the ice so that when the reel is rotated under the action of a fish the signal connected to the reel will be operated.

To the foregoing objects and to others which may hereinafter appear, the invention consists of the novel construction, combination and arrangement of parts as will be more specifically referred to and illustrated in the accompanying drawing, but it is to be understood that changes, variations and modifications may be resorted to which fall within the scope of the invention as claimed.

In the drawing:

Figure 1 is a detail front elevation partly broken away of a fishing device constructed according to an embodiment of this invention, Figure 2 is detail side elevation partly broken away and in section of the device illustrating the signal carrier in full lines for holding the signal in non-signalling position, the carrier in dotted lines extended for holding the signal in signalling position, the carrier in dotted lines when folded, and the supporting member in dotted lines when folded, and Figure 3 is a fragmentary sectional view taken on the line 3—3 of Figure 2.

Referring to the drawing, the numeral 10 designates an elongated relatively rigid rod which is substantially rectangular in transverse section and is provided at one end thereof with a twisted portion 11. This twisted portion 11 is adapted to be submerged in the water. A cross bar or supporting member 12 is secured at substantially the longitudinal center thereof to the rod 10 at a point at one side of the longitudinal center of the rod 10 by means of a rivet or pivotal member 13. The rivet 13 frictionally holds the bar 12 in the desired position. In operative position the bar 12 will be positioned at right angles to the rod 10 as shown in Figure 1.

A reel 14 is pivotally mounted on a bolt or pivotal member 15 secured as by nuts 16 to the lower end portion 11 of the rod 10. The reel 14 is adapted to have a fish line L wound thereabout and a handle in the form of a sleeve 17 mounted on a bolt 18 is carried by the outer side member 19 of the reel 14. The inner side member 20 of the reel 14 is provided with a tangentially disposed slot 21 in which the lower end of a trigger cord 22 is adapted to engage. The cord 22 is provided with a knot 23 at its free or lower end which is adapted to engage at one side of the end member 20 of the reel 14 with the cord 22 extending through the notch 21 as shown in Figure 2.

The opposite or upper end of the cord 22 is secured to the free end of a flat spring 24 which is secured to the upper end of the rod 10 by means of a rivet or pivotal member 25. The attached end of the spring 24 is secured to the side of the rod 10 opposite from the side to which the bar 12 is secured. In a collapsed position the spring 24 is adapted to be disposed with one face thereof in abutting relation to the adjacent face of the rod 10 as shown by the dotted lines 24ª. The spring 24 at its upper or free end is provided with a U-shaped clip 26 in the bight of which the cord 22 is adapted to engage. A signal member 27 in the form of a flag formed of cloth or the like is adapted to be gripped between the parallel legs 28 of the clip 26 and preferably the clip 26 is provided with one or more detents 29 adjacent the ends of the free legs so as to firmly hold the flag 27 and the cord 22 within the sides of the clip.

In the use of the device the line L is adapted to have a hook and bait secured thereto and after a hole has been cut through the ice, the cross bar 12 is disposed in the position shown in Figure 1 wherein this bar is at right angles to the rod 10. The reel 14 carrying the line L is then projected through the hole in the ice and the trigger line 22 has the knot 23 thereof engaged in the notch 21 of the reel 14. The spring 24 is bent over the upper end of the rod 10 as shown in Figure 2 and will hold the trigger cord 22 taut until the reel 14 has been rotated under the pulling action of a fish. When the reel 14 is turned in a clockwise direction as viewed in Figure 2, the cord 20 will be released and the signal member 27 will assume the position shown by the dotted lines 24ᵇ and 27ᵇ in Figure 2.

This device can be manufactured out of metal which will not corrode under the action of the water and the reel 14 may be made out of metal of a character such that the metal will not corrode under the action of the water. Due to the fact that the entire reel structure 14 is submerged in the water, the reel will at all times be free to rotate under the pulling action of a fish so that when the reel has been released under the rotation thereof in a clockwise direction by the trigger line 22, the entire line L may be unwound from the reel and in the event the water about the hole in the ice has not frozen, the release of the trigger cord 22 will permit the signal member 27 to assume a vertical or signalling position.

What I claim is:

In a foldable and extendible device for fishing under the ice a supporting bar for disposing horizontally on the ice, an elongated pivoted rod frictionally connected intermediate its ends to one side of said bar intermediate the ends of the latter, said rod including inner and outer terminal portions, the said inner portion being torsionally twisted, a reel, means for revolubly supporting the reel in lateral relation relative to one side face of said inner portion and at right angles to the remaining part of said rod, a resilient carrier in the form of a pivoted flat spring having outer and inner terminal parts, said inner part being revolubly and frictionally connected against one side face of the said outer terminal portion, a flexible combined pulling and latching member having an outer terminal portion positioned against an edge of the outer terminal part of the carrier, said member at its inner end and said reel at one side having coacting interengaging means for releasably connecting the said inner end of said member to the said side of the reel, a signal having a terminal portion positioned against a side face of the said outer terminal part of the carrier, and means engaging throughout respectively the outer terminal portion of said member and the said terminal portion of the signal for frictionally connecting them to the said other terminal part of the carrier.

EDWARD W. BIDDINGER.